United States Patent
Seo

(10) Patent No.: US 6,604,369 B2
(45) Date of Patent: Aug. 12, 2003

(54) METHOD FOR CONTROLLING OPERATION OF KIMCHI STORAGE DEVICE

(75) Inventor: Wan-suck Seo, Chengcheongnam-do (KR)

(73) Assignee: Mando Climate Control Corporation (KR)

( * ) Notice: Subject to any disclaimer, the term of this patent is extended or adjusted under 35 U.S.C. 154(b) by 0 days.

(21) Appl. No.: 10/155,431

(22) Filed: May 24, 2002

(65) Prior Publication Data

US 2003/0000234 A1 Jan. 2, 2003

(30) Foreign Application Priority Data

May 28, 2001 (KR) .......................................... 2001-29507

(51) Int. Cl.[7] .............................. G05D 23/32; A23L 1/22
(52) U.S. Cl. .............................. 62/158; 62/157; 99/470; 426/49
(58) Field of Search ........................... 62/157, 158, 159; 99/470, 468; 426/49, 231

(56) References Cited

U.S. PATENT DOCUMENTS 5,555,797 A  9/1996  Chun
6,063,420 A  5/2000  Chun et al.

*Primary Examiner*—Chen Wen Jiang
(74) *Attorney, Agent, or Firm*—Fish & Richardson P.C.

(57) ABSTRACT

Disclosed is a method for controlling operation of a kimchi storage device. A compressor operates immediately if the condition to operate the compressor is met, and a heater operates after a predetermined time delay if the condition to operate the heater has been met, whereby the variation in the temperature of a storage chamber caused by the immediate sensing of low temperature and the operation of the heater thereby can be reduced, so the flavor and freshness of the kimchi can be enhanced.

2 Claims, 2 Drawing Sheets

METHOD FOR CONTROLLING OPERATION OF KIMCHI STORAGE DEVICE

Pursuant to 35 U.S.C. 119(a)–(d), this application claims priority from Korean application no. 2001-29507, filed on May 28, 2001.

BACKGROUND OF THE INVENTION

1. Field of the Invention

The present invention relates to a method for controlling the operation of a kimchi storage device, and more particularly, to a method for controlling an operation of a kimchi storage device that maintains a predetermined temperature range of a storage chamber by operating a compressor and a heater alternately in a preservation mode of the kimchi storage device.

2. Description of the Related Art

In a general refrigerator, the inner temperature changes significantly when a door is opened and closed frequently. Thus, it is hard to keep the kimchi to the proper degree of ripeness. In order to solve such problems, a kimchi storage device has been developed, which can mature the kimchi properly so as to be agreeable to the taste or a change of seasons, and preserve the flavor of the kimchi for a long period of time at a proper temperature.

Generally, the kimchi storage device ferments and stores the kimchi according to the personal taste by warming the kimchi to ferment and mature the kimchi properly, or by cooling the kimchi to keep the kimchi unripe for a long period of time. Accordingly, the kimchi storage device has a cooling apparatus and a heating apparatus, and in order to preserve the flavor and freshness of kimchi for a long period of time. The kimchi storage device ripens the kimchi accommodated in the inner casing thereof for a short time according to its taste by using the heating apparatus, and then keeps the temperature of the inner casing properly cooled by using the cooling apparatus.

FIG. 1 is a block diagram illustrating the basic construction of a conventional kimchi storage device.

As shown in the figure, a cooling unit of the kimchi storage device is comprised of a compressor 10 for compressing refrigerant at a high temperature and a high pressure, a condenser 20 for liquefying the refrigerant by irradiating the heat in the refrigerant compressed by the compressor 10, a dryer 30 for filtering foreign substances contained in the refrigerant from the condenser 20, a decompression device 40 for reducing the pressure of the refrigerant from the dryer 30 so as to be vaporized easily, and an evaporator 50 installed in a storage chamber 90 to cool the storage chamber 90 by vaporizing the refrigerant decompressed at the low pressure by the decompression device 40 in order to absorb heat and cool the air.

Further, the kimchi storage device has a selection key input unit 70 for selecting the kind of kimchi, ripening period, ripening temperature, etc., a temperature sensor 95 for sensing the temperature in the storage chamber 90, a control unit 60 for controlling the operation of the compressor 10 according to the input of the selection key input unit 70 and the temperature sensor 95, and a display unit 80 for displaying the status of the control unit 60.

The kimchi storage device also has a heating unit. The heating unit is comprised of a heater 100 mounted on the outside surface of the storage chamber 90, which heats the kimchi and the like under the control of the control unit 60.

The kimchi storage device having the above construction operates in such a manner that the control unit 60 heats the storage chamber 90 by supplying an electrical coil 100 with electrical power to ripen the kimchi according to the kind of kimchi or the ripening temperature of the kimchi, and then turns the compressor 10 on and off repeatedly to maintain a constant temperature in the storage chamber 90.

If the operation mode of the kimchi storage device is changed to a preservation mode after the kimchi has been ripened, the control unit 60 operates the heater 100 and the compressor 10 alternately to be in the temperature range to preserve the flavor and freshness of kimchi by maintaining the temperature in the storage chamber 90 to a constant temperature.

In other words, in order to maintain the temperature within the temperature range of −1. to 1., the heater 100 is controlled to operate when the temperature of the evaporator 50 drops below −1., and the compressor 10 is controlled to operate when the temperature of the evaporator 50 becomes above 1.

However, in such a conventional method for controlling an operation of a kimchi storage device, when conditions to operate the heater are met only in a certain circumstances, for example, when the overall system stops operating and then resumes the operation by a sudden power failure during the normal operation in the preservation mode, when the system becomes normal again after a breakdown in the system, or when the temperature of the storage chamber suddenly becomes low as the operation mode is changed to the preservation mode by selection, the heater begins to operate immediately to raise the temperature in the storage chamber, which may cause the deterioration of the flavor and freshness of kimchi.

SUMMARY OF THE INVENTION

The present invention has been proposed to solve the above problems, and an object of the present invention is to provide a method for controlling operation of a kimchi storage device, in which a compressor operates immediately if the condition to operate the compressor is met and a heater operates after a predetermined time delay if the condition to operate the heater is met, whereby the variation in the temperature of the storage chamber caused by the abrupt sensing of low temperature and the operation of the heater thereby can be reduced.

To achieve the above object, the present invention provides a method for controlling an operation of a kimchi storage device that maintains a constant temperature range of a storage chamber by operating a compressor and a heater alternately in a preservation mode of the kimchi storage device, the method comprising the steps of: measuring a temperature in the storage chamber; determining whether the temperature in the storage chamber is within a temperature range to operate the compressor or within a temperature range to operate the heater; if the temperature in the storage chamber is within the temperature range to operate the compressor, then operating the compressor; delaying an operation of the heater for a predetermined time when the temperature in the storage chamber is within the temperature range to operate the heater; determining whether the temperature in the storage chamber comes within the temperature range to operate the compressor or within the temperature range to operate the heater; if the temperature in the storage chamber comes within the temperature range to operate the compressor, then clearing a delay time for operating the heater, and operating the compressor immediately; if the temperature in the storage chamber is within a range of temperature to operate the heater, then operating the heater.

According to the present invention, as the temperature of the storage chamber measured in the preservation mode is determined to meet the conditions to operate the compressor, the compressor begins to operate immediately. And, as the temperature is determined to meet the conditions to operate the heater, operation of the heater is delayed for a certain amount of time, while the temperature of the storage chamber is measured. Then, the heater begins to operate only when the condition to operate the heater is still maintained after the time delay, and the compressor begins to operate if the temperature is changed to the condition to operate the compressor.

BRIEF DESCRIPTION OF THE DRAWINGS

The above-mentioned objects and features of the present invention will be more apparent by describing the preferred embodiment of the present invention by referring to the accompanying drawings, in which.

DETAILED DESCRIPTION OF THE PREFERRED EMBODIMENT

The present invention will hereinafter be described in more detail by the preferred embodiments of the invention. The present embodiment does not limit the scope of the present invention, but it is only the example of the present invention.

Figure 2:
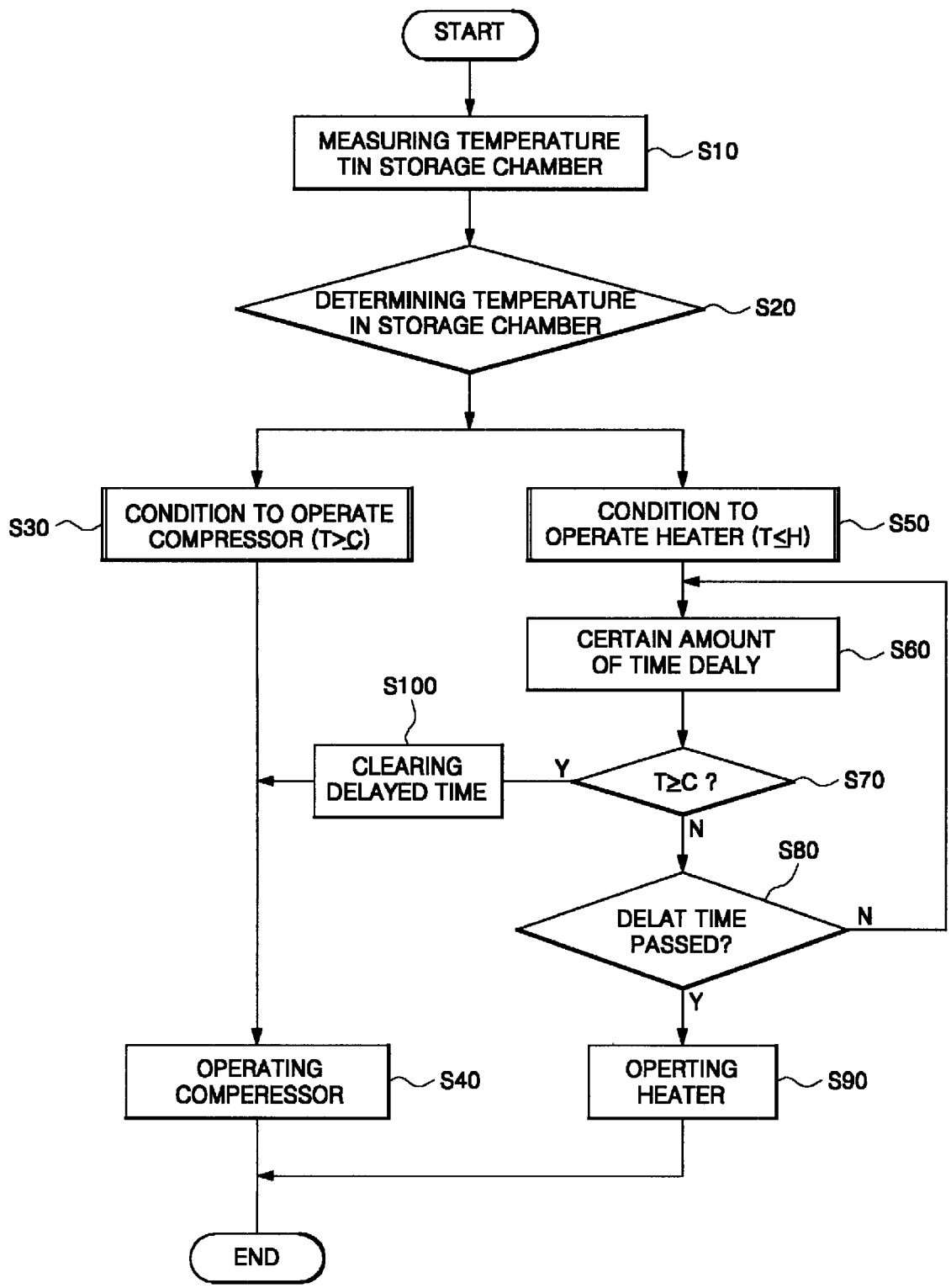
FIG. 2 is a flow chart illustrating the method for controlling the operation of the kimchi storage device according to the present invention.

FIG. 2 is a flow chart illustrating the method for controlling the operation of the kimchi storage device according to the present invention.

The control method of the present invention is illustrated with reference to the general kimchi storage device shown in FIG. 1 which is has been illustrated as the conventional art of the present invention.

Furthermore, the control method of the compressor and the heater according to the present invention is illustrated only in the case that the kimchi storage device operates in the preservation mode among various operation modes of the kimchi storage device.

At first, the temperature of the inner chamber of the storage chamber 90 in the preservation mode is measured (S10). Then, the measured temperature of the storage chamber is determined (S20). At this time, if the measured temperature meets the condition to operate the compressor (S30), the compressor 10 immediately lowers the temperature of the inner chamber (S40).

However, if the measured temperature meets the condition to operate the heater 100 (S50), operation of the heater 100 is delayed for a certain amount of time, in order to determine whether the temperature of the storage chamber has become low for a certain reason that, for example, the overall system stops operating and then resumes the operation by a sudden power failure during the normal operation in the preservation mode, the system becomes normal again after a breakdown in the system, or the temperature of the storage chamber suddenly drops as the operation mode is changed to the preservation mode by the change of the selection.

While the beginning of the operation of the heater 100 is delayed, the measured temperature of the storage chamber is compared with the condition needed to operate the compressor 10 (S70). If the measured temperature meets the condition to operate the compressor 10, the delayed time is cleared (S100), and then the compressor 10 is operated immediately (S40).

However, if the predetermined time to be delayed has passed while the measured temperature is maintained to the temperature meeting the condition to operate the heater 100, the heater 100 is then operated to raise the temperature of the storage chamber (S90).

In such a situation, the delay time is preferably set to one hundred minutes so that the heater 100 begins to operate if the temperature of the storage chamber is maintained low without any operation of loads after one hundred minutes. Then, the variation in temperature, which may be caused by the malfunction of the sensor or the operation of loads, can be minimized.

As described above, according to the present invention, the compressor operates immediately if the condition to operate the compressor is met and the heater operates after a predetermined time delay if the condition for operating the heater is met, whereby the variation in temperature of a storage chamber caused by the sudden change in temperature and the operation of the heater thereby can be reduced.

Furthermore, the deterioration of flavor and freshness of kimchi, which may be caused by the variation of the temperature in the storage chamber when the heater is operated by the malfunction of the kimchi storage device, can be prevented.

Although the preferred embodiment of the present invention has been described, it will be understood by those skilled in the art that the present invention should not be limited to within the spirit and the scope of the present invention. Accordingly, the scope of the present invention is not limited within the described range but the following claims.

Figure 1:
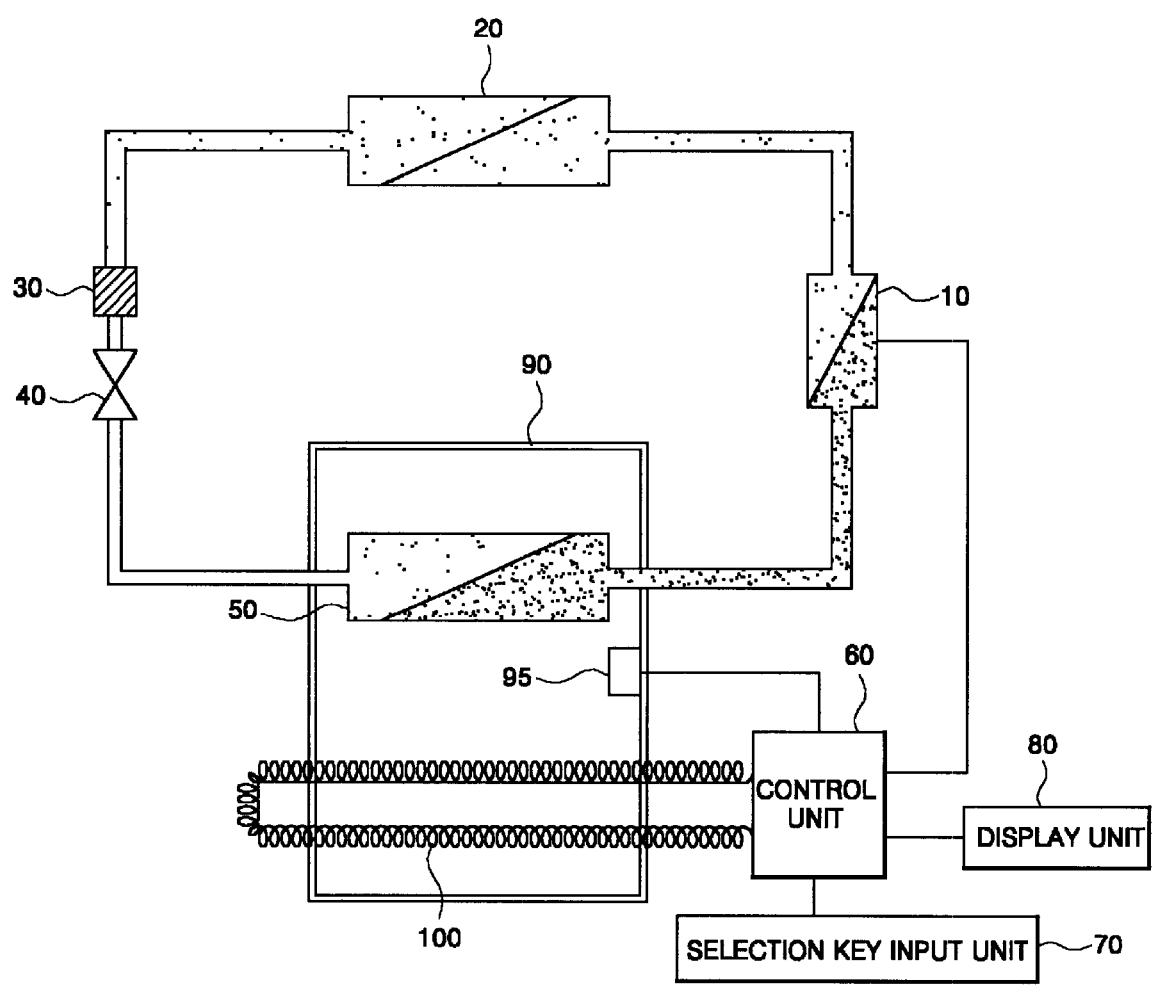
FIG. 1 is a block diagram illustrating the basic construction of a conventional kimchi storage device.

Drawings
FIG. 1
60: CONTROL UNIT
70: SELECTION KEY INPUT UNIT
80: DISPLAY UNIT
FIG. 2
START
S10: MEASURING TEMPERATURE T IN STORAGE CHAMBER
S20: DETERMINING TEMPERATURE IN STORAGE CHAMBER
S30: CONDITION TO OPERATE COMPRESSOR (T$\geq$C)
S40: OPERATING COMPRESSOR
S50: CONDITION TO OPERATE HEATER (T$\leq$H)
S60: CERTAIN AMOUNT OF TIME DEALY
S70: T$\geq$C?
S80: DELAY TIME PASSED?
S90: OPERATING HEATER
S100: CLEARING DELAYED TIME
END

What is claimed is:

1. A method for controlling an operation of a kimchi storage device that maintains a constant temperature range of a storage chamber by operating a compressor and a heater alternately in a preservation mode of the kimchi storage device, the method comprising the steps of:

measuring a temperature in the storage chamber;

determining whether the temperature in the storage chamber is within a temperature range to operate the compressor or within a temperature range to operate the heater;

if the temperature in the storage chamber is within the temperature range to operate the compressor, then operating the compressor;

delaying an operation of the heater for a predetermined time when the temperature in the storage chamber is within the temperature range to operate the heater;

determining, after delay time, whether the temperature in the storage chamber comes within the temperature range to operate the compressor or within the temperature range to operate the heater;

if the temperature in the storage chamber comes within the temperature range to operate the compressor, then clearing a delay time for operating the heater, and operating the compressor immediately;

if the temperature in the storage chamber is within a range of temperature to operate the heater, then operating the heater.

2. The method according to claim 1, wherein the predetermined time is one hundred minutes.

* * * * *